July 6, 1965
G. SIEBOL
3,192,821
BLIND RIVET HAVING A GROOVED AND
DEFORMABLE LOCKING BOSS
Original Filed Feb. 6, 1961
2 Sheets-Sheet 1
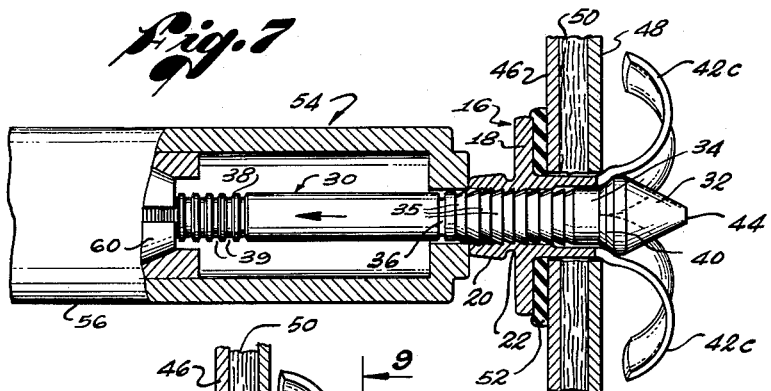
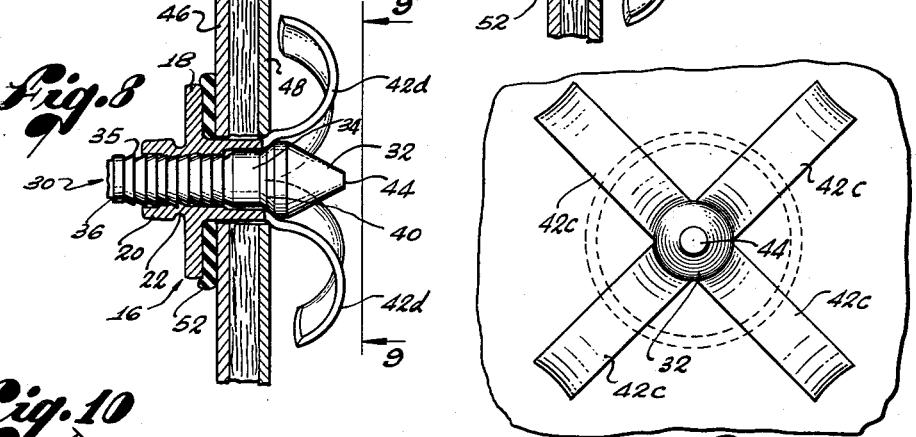
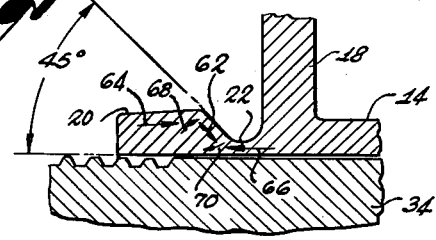
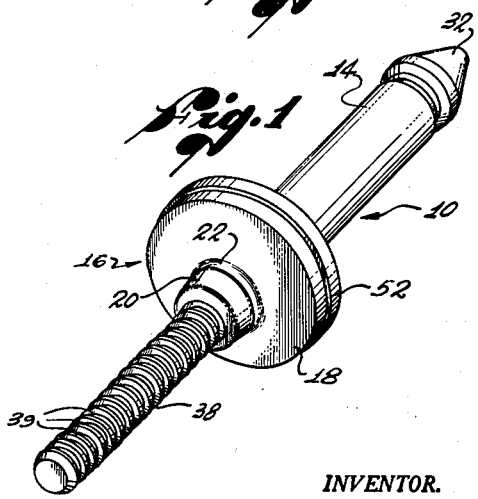
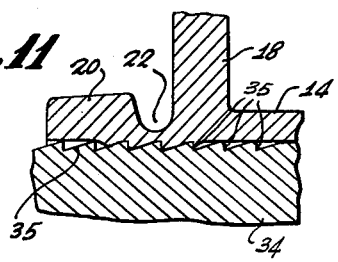
INVENTOR.
GEORGE SIEBOL
BY
Attorneys

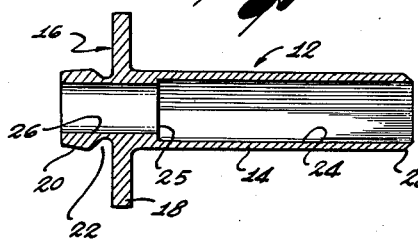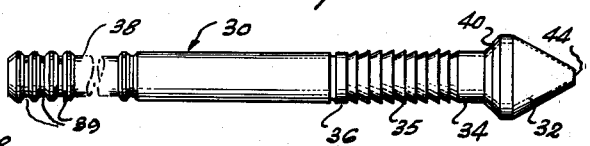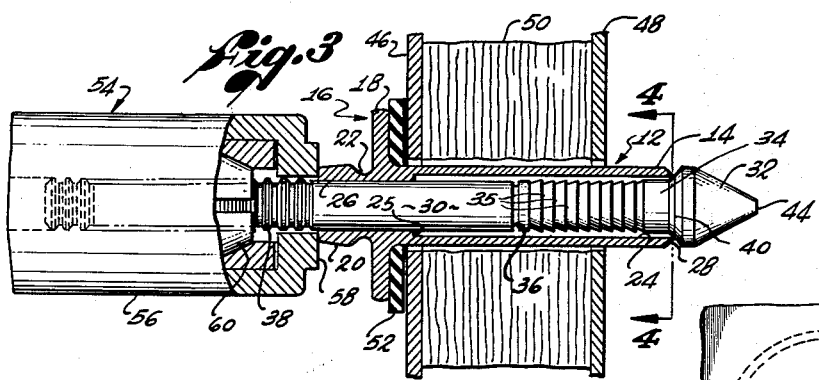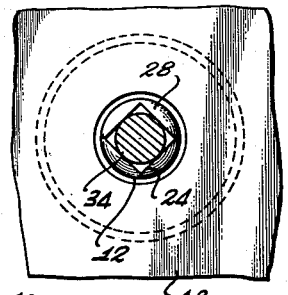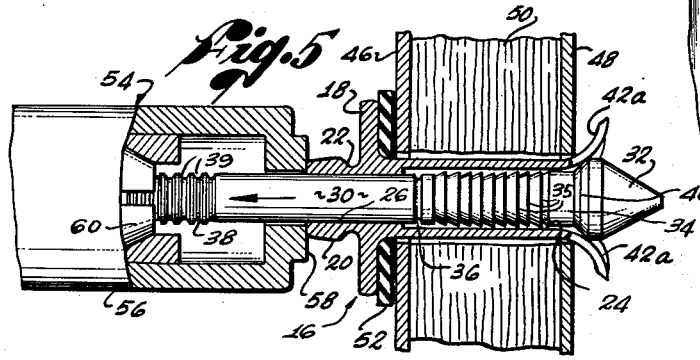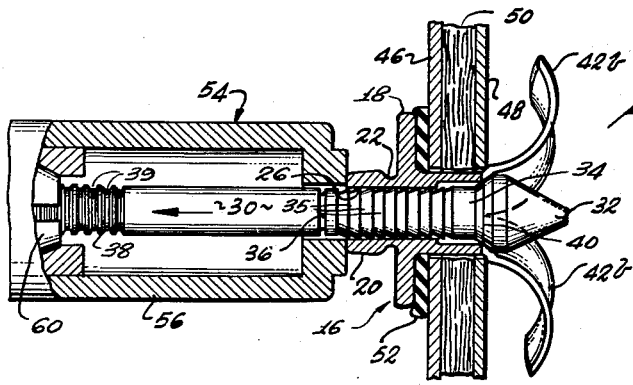
INVENTOR.
GEORGE SIEBOL 3,192,821
BLIND RIVET HAVING A GROOVED AND
DEFORMABLE LOCKING BOSS
George Siebol, Garden Grove, Calif., assignor to Olympic
Screw & Rivet Corporation, Downey, Calif., a corporation of California
Continuation of application Ser. No. 87,257, Feb. 6, 1961.
This application Nov. 19, 1962, Ser. No. 239,868
4 Claims. (Cl. 85—77)

This application is a continuation of copending application Serial No. 87,257 filed February 6, 1961, now abandoned, and in certain aspects, this invention constitutes an improvement over the inventions disclosed in the copending applications of Robert F. Kolec et al., Serial No. 827,876 filed July 17, 1959, now abandoned, and Serial No. 846,102 filed October 13, 1959, now Patent No. 3,065,661.

This invention relates generally to fastening devices, and more particularly to blind rivets, which are especially adapted to so-called blind riveting of structural or sheet members, where access to such members may be had from one side only. This invention is especially adapted for such use in connection with the fabrication of sheet metal structures, where the members to be riveted together are often initially relatively widely separated and sometimes misaligned and which occasionally may include one or more resilient or compressible components thereon or therebetween, all of which must be pulled together by the rivet and clamped tightly and securely together.

Blind rivets of the kind heretofore generally employed and designed to be set mechanically, usually include two basic parts, one part being a tubular body having a shank portion with a rivet head formed integrally on one end thereof, and the other part being a headed setting pin which extends slidably through the entire length of such tubular body, shank, and rivet head. The setting pin is positioned within the tubular body, such that the head of the setting pin is initially located exteriorly adjacent the outer end of the tubular shank and with the opposite gripping end portion of the pin protruding from the rivet head. In use, such rivets are adapted to be inserted, shank end first, through suitably sized and aligned rivet holes in the several members to be fastened together. Then, by pulling on the gripping portion of the setting pin, while at the same time applying opposite force against the rivet head, the pin head is thereby drawn forcefully against or into the outer end of the tubular shank, so as to expand a portion thereof and thereby form an enlargement which engages the back of the inner one of the members. The members are thus clamped together between such enlargement and the rivet head.

The setting pin is usually provided with an intermediately located groove or weakened section, called a "break-neck" so that, following the clamping together of the elements to be riveted and the subsequent final setting of the rivet, a continued pull of increasing force on the gripping portion of the pin will, when the tension reaches a predetermined maximum value, result in parting of the pin at the break-neck, thereby removing the protruding portion of the pin and detaching the setting tool, leaving the fully set rivet retaining therein the undetached portion of the setting pin.

In the use of blind rivets of the before mentioned kinds, it has been found that the portion of the setting pin remaining the body of the finally set rivet following the parting of the protruding portion thereof, is seldom retained in the desired finally positioned and fully tensioned condition which it had just prior to the before mentioned parting of the pin and release from the setting tool. As a consequence, the rivet's maximum grip or clamping force upon the fastened members is seldom fully maintained and, therefore, the rivet often fails to develop its full strength both in tension and shear. Such inability or failure of the rivet to retain its full strength in tension is particularly detrimental where the members thus riveted together are required to be pulled by the rivet into proper fit and alignment, and also where such members may include resilient or compressible components of variable and unpredeterminable thickness, all of which subject the rivet to unusually high tensile force and strength requirements. In the absence of special and effective means to retain the portion of the setting pin remaining in the set rivet so as to impart the required tensile strength to the set rivet, the elements so riveted together are apt to be loose or insecure, or the joint so riveted may even entirely fail. Therefore, the kinds of rivets heretofore generally used, have required, for any reasonably good and proper performance thereby, that the members to be riveted initially fit quite closely and accurately together and with considerable precision in the size and alignment of the rivet holes therein, thereby minimizing the tensile strength requirements of said rivets. A further reason for such requirements is that such rivets were not usually capable of pulling together members, which are initially poorly fitted together and in which the rivet holes are misaligned.

Various ways have been sought to overcome the before mentioned defects and limitations and to provide adequately firm retention of the pin in the rivet including retention of tensile stress in the pin and in the set rivet, but the structure required to accomplish this has heretofore involved excessive complication and expense, and even then often failed fully to attain the described results. For example, in some of the blind rivets heretofore known, retention of the setting pin and maintenance of tensile stress therein has been attempted by swaging a suitably formed portion of the rivet head or body radially inwardly against the setting pin, which extends centrally therethrough while the pin is under tension prior to parting of the gripped portion of the pin from the rivet. However, there is inherently a certain amount of spring-back of any metal swaged in this manner against another resistant body of metal. Accordingly, the resulting relaxation of the grip of the thus swaged portion of the rivet upon the setting pin, following the removal of the swaging force, often results in loosening of the clamping force of the rivet upon the fastened members.

The hereinbefore mentioned swaging process has an additional, serious disadvantage in that the setting force exerted on the rivet body or head in such swaging process causes pinching of the setting pin prematurely, while the setting pin is still being drawn through the rivet body, as it is being finally set. This results in broaching of the inside of the tubular rivet body at the point of such pinching contact with the pin, which contributes further to the inability of the rivet body to adequately grip the pin. Such premature pinching of the moving setting pin also adds greatly to the total pulling force required to be applied to the setting pin to set the rivet, necessitating the use of larger and more powerful setting tools and, moreover, often results in the breaking of the pin at the break-neck before the rivet is fuly set. On the other hand, a reproportioning of the rivet setting pin and break-neck groove to avoid such premature breaking of the pin often results in the pin head being pulled entirely through the holes in the outer one or ones of the elements to be fastened together before such breakage and release from the setting tool occurs. Various ways have also been sought to impart improved ability in the blind rivet to reach through the before mentioned elements to be fastened together, regardless of a certain amount of misfitting of such elements and misalignment of the rivet holes therein, and pull such elements and rivet holes together into adequate alignment and to firmly and securely fasten such elements together in such position.

Rivets of the latter kinds are particularly needed in connection with the fabrication of sheet metal building structures where the various walls, roofing, and partitions may comprise sheet metal plates or panels, which are required to be riveted together and which may require attachment thereto or the inclusion therebetween of layers of material of variable thickness, and which may be resilient or compressible in thickness such as sound and heat insulating material such as rock wool, Fiberglas, and the like.

It is, accordingly, an object of this invention to provide a blind rivet device having improved ability, in use, to pull together one or more initially relatively widely separated and sometimes misaligned elements, particularly where such elements may include resilient or compressible components of unpredetermined thickness, and to clamp and securely rivet such elements and components tightly together.

It is also an object of this invention to provide a blind rivet device having improved ability to maintain high clamping force upon the riveted elements.

It is another object of this invention to provide a blind rivet having improved setting pin retention ability such as to result in improved strength of the rivet, particularly in tension.

It is a still further object to provide a blind rivet, in which the foregoing objects may be attained and yet, which may be readily and efficiently set by means of hand operated tools readily available and conveniently handled.

The objects of this invention are accomplished, in general, as will be more fully described herein, first, by providing a rivet, in the setting process of which the tubular shank is progresively split outwardly into a plurality of petal-like fingers or prongs, the splitting being such that a sliding action between the root portions of such fingers or prongs and the adjacent material at the edges of the rivet holes result in correspondingly progressive pulling together and compressing of the several elements to be riveted together; and second, by avoiding any swaging of any part of the rivet for gripping the setting pin, and instead providing the rivet with a rivet pin of such form and the rivet head with a pin gripping portion of such form that the longitudinal setting force applied thereto will tend to increase the diameter of such gripping portion, thereby introducing permanent, circumferential tensile stresses therein, which cause the inner portion of said gripping portion to close forcefully in locking engagement upon such setting pin at whatever position the setting pin fiinally takes in the set rivet. With such action, there is substantially no spring-back or resultant relaxation of the grip upon the pin, and the clamping force of the rivet upon the elements to be riveted is thereby fully maintained.

These and other objects, advantages, and features of novelty will be evident from a consideration of the following specification in connection with the accompanying drawings, in which:

FIGURE 1 is a perspective view of a rivet embodying the present invention.

FIGURE 2A is a longitudinal sectional view of the body, including the tubular shank and integral rivet head portion, of the rivet of FIGURE 1.

FIGURE 2B is an elevational view of the setting pin portion of the rivet of FIGURE 1.

FIGURE 3 is a view partly in longitudinal section and partly in elevation of the rivet assembly showing its appearance as initially inserted in position through perforations in sheet members and an intermediate layer of compressible material to be fastened together, such rivet assembly being connected to a setting tool in readiness for setting.

FIGURE 4 is a cross sectional view taken on line 4—4 of FIGURE 3.

FIGURE 5 is a view similar to FIGURE 3 showing an initial stage of the rivet setting operation with the sheet members beginning to be drawn together and the layer of compressible material therebetween beginning to be compressed.

FIGURE 6 is also a view similar to FIGURE 3, but showing a further stage of the rivet setting operation, in which the sheet members have been pulled more closely together in clamped position with the layer of material therebetween compressed.

FIGURE 7 is also a view similar to FIGURE 3, but showing a still further stage of the operation of the apparatus and illustrating the pin stem retention step.

FIGURE 8 is a longitudinal section through the rivet, as finally set in the members to be fastened together, with the setting tool removed and the grip portion of the setting pin detached.

FIGURE 9 is an end elevational view of the set rivet, taken as indicated by the line 9—9 of FIGURE 8.

FIGURE 10 is an enlarged, fragmentary, longitudinal sectional view of a portion of the blind rivet head showing the pin retention means, as it appears in FIGURES 1 to 6, inclusive, before the final rivet setting operation.

FIGURE 11 is an enlarged fragmentary sectional view of the same portion of the rivet head, as shown in FIGURE 10, showing the pin retention means, as it appears in FIGURES 7 to 9, inclusive, after the final rivet setting operation.

Referring first primarily to FIGURES 1 to 4, inclusive, of the drawings, a preferred embodiment of the invention comprises a rivet assembly 10 consisting of two principal parts, namely, a tubular body portion 12 and a setting pin portion 30.

The tubular body portion 12 is formed with a sleeve or tubular shank 14, one end portion of which carries a head 16 which may be of various forms, but by way of illustration is here shown as formed with an integral, laterally extending, annular flange 18 forming a shoulder facing toward the aforesaid shank portion 14, and a central oppositely extending, coaxial, annular boss 20. The flange 18 and the boss 20 are partially separated from one another by an intermediate, exterior, annular groove 22.

The tubular shank portion 14 of the body 12 is provided with a setting pin passage extending axially therethrough from end to end. The forward portion of such passage, which extends from the forward end of the tubular shank sleeve to an intermediate section 25 adjacent the rivet head, may take various forms. For example, it may be polygonal in internal cross section and is preferably, as best shown in FIGURE 4, square in internal cross section. The continuing portion 26 of the aforesaid passage, which extends from the square portion 24 axially through the head portion 16 of the body, is circular in internal cross section and of an inside diameter substantially equal to the minimum transverse inside diameter of the square portion 24 of the passage. The outer end portion of the tubular shank 14 is preferably, although not necessarily, beveled as shown at 28.

The setting pin 30 is formed with an integral pin head 32 adjacent one end thereof, a cylindrical stem portion 34 extending back from the pin head 32 to an annular groove or break-neck 36 located at an intermediate section thereof, and a cylindrical grip portion 38 extending the balance of the length of the setting pin from the break-neck 36. The grip portion 38 preferably has formed on the exterior thereof a multiplicity of annular grooves 39 to facilitate gripping of the stem, as by the jaws of a suitable pulling or setting tool. The stem portion 34 of the pin is also formed with a plurality of annular serrations or grooves 35, preferably of saw-toothed or buttress form, facing the pin head. The hereinbefore mentioned annular boss 20 and break-neck groove 36 in cooperation with the saw-tooth serrations or grooves 35 form an important feature of this invention, as will be hereinafter more fully described.

The pin head 32 of the setting pin 30 is formed with a maximum outside diameter approximately equal to or preferably at most not substantially greater than the outside diameter of the tubular shank portion 14 of the tubular rivet body 12. The juncture of the pin head 32 and the stem portion 34 of the setting pin is formed with inwardly convergent, frusto-conical surfaces, as shown at 40, which serve, in the rivet setting operation, as wedges progressively to split the tubular portion 14 longitudinally and bend it open in the setting process to form a plurality of laterally extending, petal-like fingers or prongs 42 as shown, for example, at 42a, 42b, 42c, and 42d in FIGURES 5 to 8, respectively. The outer end of the pin head 32 is preferably pointed, as shown at 44, to facilitate its insertion through holes in sheet members and in the penetration through other mataerial, which may be placed on or between such sheet members to be fastened together, as hereinafter described.

In use, the blind rivet is first assembled, as shown in FIGURE 1. The blind rivet assembly 10 is then inserted, shank end first, into previously formed and substantially aligned holes through the structural elements or sheets to be joined such as, for example, two overlapping metal sheets 46 and 48, between which is positioned a layer of resilient or compressible material 50 such as, for example, a Fiberglas heat insulation blanket, such that the forward shoulder of flange 18 of the rivet head is pressed into firm contact with the accessible front surface of the outer sheet 46, and the shank portion 14 and pin head 32 are punched through the insulation layer 50 and extend through and beyond the inaccessible, back side of the inner sheet 48 which is the so-called blind side of the assembly. A washer 52, which may be made of rubber or other suitable elastomer, may be employed and positioned in the rivet assembly, as shown, between the shoulder of the flange 18 and the adjacent surface of the sheet 46, particularly when it is desired to render the assembly watertight.

With the blind rivet assembly 10 having been inserted through the holes in the assembly of elements or sheets and through the insulation layer to be joined, as hereinbefore described, a suitable rivet setting tool is applied to the rivet assembly. A number of suitable kinds of rivet setting tools are well known and available, but by way of brief example, a suitable tool, as illustrated at 54 in the drawings, comprises a cylindrical thrust member 56 having an open forward end portion 58, which is adapted to receive the extending grip portion 38 of the setting pin and to seat against the head of the rivet and, in the present case, is adapted to seat against the outer end of the boss 20 of the rivet. A pulling mechanism contained in the interior of the cylindrical member is adapted to be moved, by suitable power means, axially of the thrust member 56, and this mechanism includes segmented collet-like gripping jaws 60, which may have inner annular grooves adapted to fit and be forced into gripping engagement with the before mentioned annular grooves 39 on the grip portion 38 of the setting pin 30.

Upon actuation of the rivet setting tool, the pulling member including the jaws 60 is moved axially inward relative to the end portion 58 of the thrust member 54, thus applying tension to the setting pin 30 and applying an equal and opposite thrusting force against the adjacent outer end of the boss 20 of the rivet head. As a result of the application of such forces to the rivet, the pin head 32 of the setting pin 30 is drawn against and into the outer beveled end 28 of the tubular shank portion 14 of the body of the rivet, with the result that the wedging action of the inner tapered portions 40 of the pin head causes the end of the tubular shank to split and open outwardly to form a plurality of curved, laterally extending petal-like fingers or prongs, the initial stage of which splitting action and the initial formation of such prongs is illustrated at 42a in FIGURE 5. The number of petal-like fingers or prongs which will be thus formed depend upon a number of design considerations. In the present case, where the portion 24 of the passage through the tubular shank portion 14 of the rivet body 12 is square in internal cross section, four laterally extending petal-like fingers or prongs are formed, the severance or tearing of the metal to form such four petal-like fingers or prongs occurring progressively adjacent the pin head longitudinally through the walls of the tubular shank portion 14 along the corners of the square shaped interior passage 24. It is to be noted that at the initial stage of such setting of the blind rivet, as shown in FIGURE 5, the structural elements or sheets 46 and 48 to be joined together may be loose and relatively widely separated, the insulation body 50 therebetween being in its free, expanded condition. However, upon the initial formation of the outwardly curved prongs, as before mentioned and as shown at 42a, the root portions of these prongs, that is the portions thereof closest to the shank adjacent the point of progressive splitting thereof, commence to apply an inward bearing force to the inner sheet 48 at the edge of the rivet hole therethrough, which commences to draw the two sheets 46 and 48 together against the rivet head flange 18 and to compress the thickness of the insulation material 50 therebetween, as shown in FIGURE 5.

Referring next primarily to FIGURES 5 to 9, inclusive, a further sequence of stages of the progressive setting of the blind rivet are there illustrated. As the pin 30 and the head 32 are continued to be pulled into the tubular shank portion 14 of the body 12 of the rivet, longitudinal splitting of the shank portion progressively continues, and by reason of such progressive splitting action, the curled prongs thus formed continue, by the inward bearing action of the root portion thereof upon the metal at the edges of the holes in the sheet 48, to draw the sheets 46 and 48 closer together and continue to compress the insulation material 50 therebetween. Splitting of the tubular shank portion 14 progresses as aforesaid, until the material 50 is quite solidly compressed between the sheet members 46 and 48, and the inner beveled portion of the pin head 32 is, therefore, brought up into relatively solid clamping engagement with the root portions of the split prongs, which have been forced outwardly into wedging engagement with the edges of the element 48 immediately surrounding the rivet hole therethrough, thereby tightly clamping the elements 46 and 48, the washer 52, material 50, and the root portions of the split prongs together between the rivet flange 18 and the pin head 32, as shown in FIGURE 6.

At this stage in the setting of the rivet, substantially no further movement of the pin 30 and pin head 32 axially relative to the tubular body portion 12 and the flange 18 of the rivet can take place and, therefore, application of still further increasing force to the rivet by the setting tool 54 results in increasing tension in the pin 30 and correspondingly increasing opposite axial thrust against the end of the boss 20. When this latter force has increased to a predetermined value, the metal forming the bottom of the before mentioned annular groove 22 and the metal in the portion of the boss 20, which is adjacent the side of the groove, is subjected to axial forces which, by reason of the shape and position of the groove, has a radially directed component, as illustrated by the double headed arrow 62 in FIGURE 10, sufficient to thrust the surrounding metal in the outer layers of the boss 20 radially outward and at the same time, as a result thereof, force the inner layers of the metal in the boss adjacent the groove 22 radially inward into gripping engagement with such of a number of the saw-toothed serrations or grooves 35 on the pin stem portion 34 as happens to be positioned therein at that stage of the setting operation, as illustrated in FIGURE 11. In this gripping action, a force couple set up by the offset, opposite, parallel rivet setting forces, illustrated by the arrows 64 and 66, may be considered as resulting in effect in rotational deformation in a clockwise direction, of a portion of the body of metal in the boss 20, as represented approximately by the arrows 68 and 70 as viewed in FIGURE 10. This rotational deformation, in turn, introduces the before mentioned radial forces, as represented by the double headed arrow 62. This also results in a longitudinal narrowing of the groove, as shown in FIGURE 11, which causes the metal therein adjacent the inner portion of the flange 18 to be deformed downwardly into forceful engagement with the grooves or serrations 35 of the pin. The flange 18 immediately surrounding the thus downwardly deformed portion of the grooves imparts a strength and rigidity thereto which greatly contributes to its holding pressure. Circumferential tensile strain with the resultant tensile stress is thus permanently introduced into the outer layer of the boss 20 and into the flange 18 which, as before mentioned, maintains the gripping force and gripping engagement between the rivet body and the serrations of the pin substantially constant without possibility of appreciable relaxation thereof upon removal of the applied rivet setting force. It has been found that to accomplish the aforedescribed gripping action of the boss 20 upon the pin 34, an angle of 45° to the longitudinal axis of the rivet, for the outer end surface portion of the annular groove 22, and a curved inner end surface of the annular groove adjoining or substantially tangential with the outwardly facing radial surface of flange 18, as indicated in FIGURE 10, appears to give optimum results.

This gripping action, therefore, has advantages over the so-called swaging method heretofore conventionally employed in connection with a number of blind rivet designs, in which the metal is forced by so-called swaging action directly inwardly against the axial pin member, by means of a surrounding forming tool. In such swaging method, regardless of how forcefully the surrounding metal of any external portion of the rivet is forced and deformed radially against the central member, when such force is removed there is always some spring-back, the greatest amount of which is in the external portion, which results in some relaxation of the desired grip upon the pin, which, in turn, results in retrograde movement of the pin and loosening of the rivet only. Very slight retrograde movement of the pin is required in many cases to result in substantial loosening of the rivet.

Finally, after completion of the before described steps of the present invention in setting of the rivet, the application of still greater force to the rivet by the setting tool, increases the tension in the setting pin 30 until it breaks at the break-neck groove 36, thereby detaching the grip portion 38 from the setting pin and leaving the fully and tightly set rivet free of the setting tool, as shown in FIGURE 8. Under such conditions, the serrated or grooved portion of the rivet pin remaining in the rivet is firmly gripped by the metal of the rivet body adjacent the groove 22 in the rivet head, such that the tensile stress therein is retained at a value nearly equal to that which it had just prior to the parting of the pin at the break-neck. Thus, the rivet is imparted adequate tensile strength and retains its forceful grip upon the riveted members.

Various material may be used for the components of the rivet, but for most uses aluminum alloys have been best suited. Good results have been obtained where the tubular body of the rivet and the setting pin have been made of 5056 (56S) and 2024 (24ST) (24S-0) aluminum alloys, respectively.

It is to be understood that the foregoing is illustrative only and that the invention is not limited thereby, but may include various modifications and changes made by those skilled in the art without distinguishing from the scope of the invention, as defined in the appended claims.

What is claimed is:
1. A blind rivet adapted for insertion from the top side in aligned apertures in overlapped structural sheets and setting under tension therein:
   a tubular body having an axial passage from end to end therethrough;
   a flange formed adjacent a top end of said body and of a diameter substantially larger than said body to seat against the topmost of said sheets;
   a pin for setting said rivet received in said passage with a tail portion protruding from the top end and a head protruding from the other end of said body, said head having an annular setting surface facing generally toward said body and adapted upon pulling of said head against the end of said body by tension applied to said tail portion to deform an end-adjacent portion of the body progressively radially outward to wedge the thus deformed portion between said setting surface and the undermost of said sheets at the edge of the aperture therein to clamp said sheets together between the flange and thus deformed portion of said body;
   and lock means to lock said pin after setting, comprising:
   an annular boss on the top of said flange, closely surrounding the end of said axial passage, said boss having an outer circumferential groove formed therein closely adjacent the top surface of said flange, and said boss having a top surface end adapted to receive pressure to axially compress said boss by reactive forces resulting from tension applied to said tail portion of said pin, said boss having strength at said groove capable of withstanding axial compressive forces therein up to a predetermined force at which said boss yields radially inwardly at said groove, said predetermined force being greater than a force required to deform said end adjacent portions of said body outwardly to clamp said sheets together;
   and a series of axially spaced apart circumferential serrations on said pin spaced from said setting surface by a distance less than the length of said axial passage and the spacing of successive serrations in said series being substantially less than the width of said groove, whereby upon tensioning of said pin to deform said body and the simultaneous application of said reactive force to said end surface of said boss, the grooved boss portion of said boss buckles inwardly to engage at least one of said serrations to lock said pin in place under tension in said passage when said tension and reaction force reaches a predetermined value.

2. A blind rivet adapted for insertion from the top side in aligned apertures in overlapped structural sheets and setting under tension therein:
   a tubular body having an axial passage from end to end therethrough;
   a flange formed adjacent a top end of said body and of a diameter substantially larger than said body to seat against the topmost of said sheets;
   a pin for setting said rivet received in said passage with a tail portion protruding from the top end and a head protruding from the other end of said body, said head having an annular setting surface facing generally toward said body and adapted upon application of tension in a setting direction to said tail portion with resultant movement of said head against said body to deform an end-adjacent portion of the latter progressively, radially outward to wedge the thus deformed portion between said setting surface and the undermost of said sheets at the edge of the aperture therein to clamp said sheets together between the flange and thus deformed portion of said body;
   and lock means to lock said pin after setting, comprising:
   an annular boss on the top of said flange closely surrounding the end of said axial passage, said boss having an outer circumferential groove formed therein closely adjacent the top surface of said flange, and said boss having a top end surface adapted to receive pressure to axially compress said boss by reactive forces resulting from said application of tension to said tail portion of said pin, said boss having strength at said groove capable of withstanding axial compressive forces therein up to a predetermined force at which said boss yields radially inwardly at said groove, said predetermined force being greater than a force required to deform said end adjacent portions of said body outwardly to clamp said sheets together;

and a group of axially spaced apart, circumferential, buttress shaped serrations on said pin spaced from said setting surface by a distance less than the length of said axial passage, whereby upon tensioning of said pin to deform said body, as aforesaid, and the simultaneous application of said reactive force to said boss end surface, the grooved portion of said boss buckles inwardly to engage at least one of said serrations to lock said pin in place under tension in said body when said tension and reaction force reaches a predetermined value, said buttress shaped serrations being oriented to effect substantially greater resistance to axial movement of said pin relative to said boss in the releasing direction than in the setting direction.

3. In a blind rivet for tension setting in aligned apertures in overlapped sheets, such blind rivet being of the type having a tubular shank formed with an enlarged flange head at one end to bear against one of said sheets when set, said shank and flange head having an axial passage extending entirely therethrough and with a setting pin extending through said passage, said pin having a head on one end thereof positioned outside the passage adjacent the end of said shank opposite the flange head, and a gripping portion on the other end, protruding from the flange head, by means of which, upon application of setting tension to said pin through said gripping portion with corresponding opposite restraining force applied against said shank head, said pin head may be drawn into said shank which is thereby split into a plurality of diverging petals, the base portions of which wedge between said pin and the aperture edge of one of said sheets to pull and clamp said sheets together;

locking means to hold said pin in said tensioned condition relative to said tubular shank, when set as aforesaid, comprising:

a coaxial tubular boss portion extending from said flange head opposite the shank;

said boss portion having an end surface to receive said restraining force and said boss portion having an encircling, outwardly facing groove intermediate the abutment surface and flange head, the bottom of said groove being rounded and located with one edge thereof making a substantially tangential juncture with the adjacent laterally extending surface of said flange head, said boss having strength at said groove capable of withstanding axial compressive forces therein up to a predetermined force at which said boss yields radially inwardly at said groove, said predetermined force being greater than a force required to clamp said sheets together with said diverging petals;

a plurality of axially spaced apart serrations on said setting pin, said serrations being located intermediate said pin head and said gripping portion thereof, the axial spacing apart of said serrations being substantially less than the width of said groove, whereby upon build up of said restraining force through said boss portion at the conclusion of setting the rivet, as aforesaid, the material forming the bottom of said groove and the adjacent portions of said boss and flange head are deformed inwardly into conforming engagement with a plurality of said serrations, along a substantial length of said pin with an attendant opposite deformation of a portion of said boss adjacent said groove to an increased diameter whereby upon removal of said restraining force said conforming engagement is retained while said pin is under tension, whereby said rivet is set with such tension retained in said pin.

4. In a blind rivet for tension setting in aligned apertures in overlapped sheets, such blind rivet being of the type having a tubular shank formed with an enlarged flange head at one end to bear against one of said sheets when set, said shank and flange head having an axial passage extending entirely therethrough and with a setting pin extending through said passage, said pin having a head on one end thereof positioned outside the passage adjacent the end of said shank opposite the flange head, and a gripping portion on the other end, protruding from the flange head, by means of which, upon application of setting tension to said pin through said gripping portion with corresponding opposite restraining force applied against said shank head, said pin head may be drawn into said shank which is thereby split into a plurality of diverging petals, the base portions of which wedge between said pin and the aperture edge of one of said sheets to pull and clamp said sheets together;

locking means to hold said pin in said tensioned condition relative to said tubular shank, when set as aforesaid, comprising:

a coaxial tubular boss portion extending from said flange head opposite the shank;

said boss portion having an end surface to receive said restraining force and said boss portion having an encircling, outwardly facing groove intermediate the abutment surface and flange head, the bottom of said groove being rounded and located with one edge thereof making a substantially tangential juncture with the adjacent laterally extending surface of said flange head, said boss having strength at said groove capable of withstanding axial compressive forces therein up to a predetermined force at which said boss yields radially inwardly at said groove, said predetermined force being greater than a force required to clamp said sheets together with said diverging petals;

a plurality of axially spaced apart, buttress shaped serrations on said setting pin, said serrations facing toward said pin head and being located intermediate said pin head and said gripping portion thereof, the axial spacing apart of said serrations being substantially less than the width of said groove, whereby upon build up of said restraining force through said boss portion at the conclusion of setting the rivet, as aforesaid, the material forming the bottom of said groove and the adjacent portions of said boss and flange head are deformed inwardly into conforming engagement with a plurality of said serrations, along a substantial length of said pin, while said pin is under tension, whereby said rivet is set with such tension retained in said pin.

References Cited by the Examiner

UNITED STATES PATENTS 3,055,100 9/62 Kimpel _____ 85—8.6
3,065,661 11/62 Kilec et al.

FOREIGN PATENTS 209,951 8/57 Australia.

EDWARD C. ALLEN, *Primary Examiner.*